United States Patent [19]

Okubi et al.

[11] Patent Number: 5,238,518

[45] Date of Patent: Aug. 24, 1993

[54] BONDING METHOD EMPLOYING AN INORGANIC ADHESIVE COMPOSITION

[75] Inventors: Ken-ichi Okubi; Akita Kitajima; Hisayuki Sato; Kiyomi Ema, all of Funabashi, Japan

[73] Assignee: Nissan Chemical Industries, Ltd., Tokyo, Japan

[21] Appl. No.: 565,236

[22] Filed: Aug. 10, 1990

[30] Foreign Application Priority Data

Aug. 14, 1989 [JP] Japan ................................. 1-209856
Feb. 6, 1990 [JP] Japan ................................. 2-26794

[51] Int. Cl.$^5$ ............................................. C09J 5/00
[52] U.S. Cl. ............................... 156/326; 106/287.16; 106/287.34; 156/325; 501/12; 501/53; 501/133
[58] Field of Search ........................... 156/325, 326; 106/287.16, 287.34; 501/12, 53, 133

[56] References Cited

U.S. PATENT DOCUMENTS

| | | |
|---|---|---|
| 3,920,578 | 11/1975 | Yates . |
| 4,170,690 | 10/1979 | Armbruster et al. ......... 106/287.16 |

FOREIGN PATENT DOCUMENTS

| | | | |
|---|---|---|---|
| 53-36514 | 4/1978 | Japan .................................. | 156/325 |
| 55-94976 | 7/1980 | Japan . | |
| 55-116658 | 9/1980 | Japan .................................. | 501/133 |
| 2058818 | 4/1981 | United Kingdom . | |

*Primary Examiner*—John J. Gallagher
*Attorney, Agent, or Firm*—Oliff & Berridge

[57] ABSTRACT

Disclosed is an inorganic adhesive composition comprising (a) an aqueous silica sol and (b) an inorganic refractory powder along with one or more material selected from (c) a fine powdery silica, (d) an aqueous alkali silicate solution and (e) a silane coupling agent. After hardening, the hardened product of the composition displays noticeably improved adhesion strength and electric insulating property.

6 Claims, No Drawings

BONDING METHOD EMPLOYING AN INORGANIC ADHESIVE COMPOSITION

FIELD OF THE INVENTION

The present invention relates to (an improvement) of an inorganic composition comprising an aqueous silica sol and an inorganic refractory powder. The composition of the present invention changes via drying to a hardened product which shows remarkably excellent properties in electric insulation and adhesion between various materials such as ceramics, glass, slates, aluminium, stainless steel, iron and other metals.

BACKGROUND OF THE INVENTION

JP-B-39-8547 (the term "JP-B" as used herein means an "examined Japanese patent publication") discloses an improved adhesive for electric appliances, which contains an aqueous silica sol (such as silica powder) having a particle size of from 5 to 150 microns and metal oxide such as boron oxide, lead oxide, antimony troxide or the like.

JP-A-48-93636 (the term "JP-A" as used herein means an "unexamined published Japanese patent application") discloses a composition comprising an acidic silica sol having a particle size of from 7 to 150 millimicrons, an aqueous solution for crystalloid silicate which is free from alkali metal ion and an inorganic refractory powder.

JP-B-56-38544 discloses an inorganic composition comprising an aqueous silica sol and an inorganic fiber or refractory powder having a particle size of from 0.1 micron to 20 microns along with pigment, aggregate and other aids.

Hardened products of adhesive compositions containing a silica sol and a refractory powder, but not containing any vitrifying components, lack sufficient adhesive strength though displaying a high heat-resistance.

An adhesive comprising from 20 to 70 parts of an aqueous silica sol having a concentration of from 2 to 40%, from 30 to 95 parts of talc, silica, mica, sillimanite, asbestos, clay, glass for electric insulation, synthetic mica, magnesium silicate, aluminium silicate, magnesium oxide, aluminium oxide or the like powder having a particle size of from 5 to 150 microns, and from 10 to 100 parts of boron oxide, lead oxide, antimony trioxide or the like, which is described in JP-B-39-8547, must be subjected to stepwise heat-treatment to be effected in the vicinity of 100° C., then 300° C. and then 600° C. in order, after having been left to stand at room temperature for a while, when it is actually used for adhesion. Such stepwise heat treatment process is not simple but is extremely complicated. Additionally, the hardened product of the adhesive vitrifies at a high temperature and therefore the heat-resistance thereof is not sufficient.

The composition illustrated in the above-mentioned JP-A-48-93636, which is composed of an acidic silica sol and a crystalloid silicate liquid does not have a sufficient storage stability, and it could not form an adhesive having a high adhesion strength. On the other hand, the composition illustrated in the above-mentioned JP-B-56-38544, which is composed of an aqueous silica sol, an inorganic fiber and a refractory powder, could not form an adhesive having a sufficient electric insulating property.

Additionally, it has been found that the hardened products of the conventional adhesives adsorb water from the aerial atmosphere to thereby gradually lower the adhesion strength.

Where an adhesive containing a silica sol and a refractory powder is applied to adhesion of various materials, only solution of the above-mentioned problems on the adhesion strength, long-time storage stability and heat-resistance is still insufficient and the adhesive is desired to have further additional higher properties. For instance, when an adhesive is to be fully filled even to fine slits between substances to be bonded with the adhesive by the use of an automatic adhesive-injector, the adhesive to be used for the purpose is desired to have a high fluidity and a good workability. Specifically, the dispersion stability of the adhesive is indispensable so that the components of the adhesive do neither precipitate nor coagulate during handling it.

In addition, where an adhesive is hardened by drying, the hardened product is desired to be free from uneven shrinkage, cracking and foaming. That is, the adhesive is desired to have a good hardening property.

On the other hand, where the parts as bonded via an adhesive are exposed to temperature variation between a low temperature condition and a high temperature condition in practical use thereof, the adhesive used is desired to have an extremely high adhesion strength and additionally the hardened adhesive layer between the parts as bonded therewith is further desired to have a properly controlled thermal expansion coefficient. In particular, in an electric-light bulb or an electric heater, the joint part between the bulb glass or jacket glass to cover the heating element and the lamp base is exposed to such a temperature variation in an extremely short period of time, or that is, it is exposed to a so-called heat shock. Accordingly, the adhesive to be applied to such a joint part is indispensable to have a sufficient heat-shock resistance enough to be resistant to repeated heat-shock of the kind without breakage of the bonded joint part.

Additionally, where at least one part of the parts to be bonded with an adhesive is a metal material, the adhesive is desired to be free from corrosion of the metal material because of the hardened adhesive layer during practical use.

SUMMARY OF THE INVENTION

The object of the present invention is to overcome the above-mentioned problems in the conventional adhesive compositions and to provide a novel inorganic composition to be able to give an adhesive which has a high electric insulating property and a high adhesion strength and which may satisfactorily bond materials of the same kind or different kinds such as ceramics, glass, slates, hardened cement products, aluminium, stainless steel, iron, and other various metal materials. The adhesive derived from the composition of the invention is free from lowering of the adhesion strength even after absorption of water.

Specifically, the present invention provides an inorganic adhesive composition which comprises the following components (a) and (b) and additionally the following component (c) or (e), or additionally two components of (c) and (d), or (c) and (e), or (d) and (e), or additionally three components of (c), (d) and (e), the total solid content based on the components being from 40 to 95% by weight. The composition is stable and has a viscosity of from 1 to 10000 poise at 20° C.

(a) An aqueous silica sol having a mean particle size of from 5 to 200 millimicrons and having a molar ratio of $SiO_2/M_2O$ of being from 30 to 2000, where M represents an alkali metal atom, an amine molecule or a quaternary ammonium group.

(b) An inorganic refractory powder having a particle size of from 0.5 to 1000 microns.

(c) A fine powder of silica having a particle size of from 5 to 400 millimicrons.

(d) An aqueous solution of an alkali silicate having a molar ratio of $SiO_2/M'_2O$ of being from 1 to 30 and having a concentration of from 1 to 60% by weight, where M' represents Na, K, Li, an amine molecule or a quaternary ammonium group.

(e) One or more coupling agents selected from the group consisting of a silane compound of the formula (I):

$$R^1Si(OR)_3 \qquad (I)$$

wherein OR is an alkoxy or acyloxy group having from 1 to 3 carbon atoms, and $R^1$ represents a monovalent organic group having from 2 to 9 carbon atoms, or a hydrolysate thereof, and a silane compound of the formula (II):

$$R^1SiCH_3(OR)_2 \qquad (II)$$

wherein OR and $R^1$ have the same meanings as defined above, or a hydrolysate thereof.

The first preferred embodiment of the adhesive composition of the present invention comprises 100 parts by weight as $SiO_2$ of the aqueous silica sol (a), from 100 to 20000 parts by weight of the inorganic refractory powder (b), and from 0.2 to 200 parts by weight of the fine silica powder (c).

The second preferred embodiment of the adhesive composition of the present invention comprises 100 parts by weight as $SiO_2$ of the aqueous silica sol (a), from 100 to 100000 parts by weight of the inorganic refractory powder (b), from 0.5 to 500 parts by weight of the fine silica powder (c), and from 0.1 to 500 parts by weight as the alkali silicate component of the aqueous alkali silicate solution of (d).

The third preferred embodiment of the adhesive composition of the present invention comprises 100 parts by weight as $SiO_2$ of the aqueous silica sol (a), from 50 to 10000 parts by weight of the inorganic refractory powder (b), and from 0.05 to 500 parts by weight of one or more coupling agents (e).

The fourth preferred embodiment of the adhesive composition of the present invention comprises 100 parts by weight as $SiO_2$ of the aqueous silica sol (a), from 100 to 100000 parts by weight of the inorganic refractory powder (b), from 0.5 to 500 parts by weight of the fine silica powder (c), and from 0.05 to 500 parts by weight of one or more coupling agents (e).

The fifth preferred embodiment of the adhesive composition of the present invention comprises 100 parts by weight as $SiO_2$ of the aqueous silica sol (a), from 100 to 100000 parts by weight of the inorganic refractory powder (b), from 0.1 to 500 parts by weight as the alkali silicate component of the aqueous alkali silicate solution (d), and from 0.05 to 500 parts by weight of the one or more of the coupling agents (e).

The sixth preferred embodiment of the adhesive composition of the present invention comprises 100 parts by weight as $SiO_2$ of the aqueous silica sol (a), from 100 to 100000 parts by weight of the inorganic refractory powder (b), from 0.5 to 500 parts by weight of the fine silica powder (c), from 0.1 to 500 parts by weight as the alkali silicate component of the aqueous alkali silicate solution (d), and from 0.05 to 500 parts by weight of one or more of the coupling agents (e).

DETAILED DESCRIPTION OF THE INVENTION

The aqueous silica sol (a) to be employed in the present invention is obtained with ease by known methods, for example, by way of treating a diluted aqueous solution of water glass with a cation-exchange substance for removal of alkali therefrom or by way of neutralizing the water glass with an acid followed by deflocculating of the silica, and it is generally in the form of a stable dispersion liquid where a colloidal silica is stably dispersed in a medium of water. The colloidal silica may have a mean particle size of from 5 to 200 millimicrons, preferably from 10 to 150 millimicrons. The shape of the colloidal silica particles may be either spherical or non-spherical. The aqueous silica sol may be either alkaline or acidic. The sol is preferred to have a molar ratio of $SiO_2/M_2O$ of being from approximately 30 to 2000, where M has the same meaning as defined above. Examples of amines to be in the sol include methylamine, ethylamine, triethanolamine, other ethanolamine and the like; and those of quaternary ammonium groups therein include tetramethylammonium, monomethyltriethanolammonium, isopropyltriethanolammonium, tetraethanolammonium and the like. It is preferable that the aqueous silica sol has an $SiO_2$ concentration of from approximately 1 to 50% by weight. It is also preferable to use a mixture comprising two or more aqueous silica sols each having a different mean particle size for obtaining a favorable composition.

The fine powdery silica (c) to be employed in the present invention preferably has a particle size of from 5 to 500 millimicrons, especially preferably from 5 to 200 millimicrons. The shape of the particles in the powder may be either spherical or non-spherical. The particles may be either crystalline or non-crystalline (amorphous), but they are preferably non-crystalline. As methods of preparing the fine powdery silica (c), there are known, for example, a gas phase method of using silicon tetrachloride as a starting material and a neutralization method of using sodium silicate as a starting material. Either of them can be employed for preparing the fine powdery silica (c) for use in the present invention. The fine powdery silica may be used in the form of an aqueous suspension of the powdery silica.

The aqueous alkali silicate solution (d) which is employed in the present invention is an aqueous solution of a silicate of an alkali metal such as lithium, sodium or potassium or of an amine or a quaternary ammonium. Examples of the amine include methylamine, ethylamine, triethanolamine, other ethanolamine and the like; and examples of the quaternary ammonium include tetramethylammonium, monomethyltriethanolammonium, tetraethanolammonium and the like. The alkali silicate has a molar ratio of $SiO_2/M'_2O$ of being from 1 to 30, preferably from 1 to 10, where M' has the same meaning as defined above. The aqueous solution has a concentration of from 1 to 60% by weight, preferably from 5 to 50% by weight of the silicate. It may contain one or more of the alkali silicates.

As examples of the inorganic refractory powder (b) for use in the present invention, there are mentioned powders of quartz, silica, feldspar, aluminium silicate, zirconium silicate, mullite, zirconia, alumina, silicon nitride, silicon carbide, talc, mica and the like. The particles in the powder may have a particle size of from approximately 0.5 to 1000 microns, preferably from approximately 0.5 to 400 microns. Additionally, powders of glass fiber, potassium titanate fiber and the like may also be employed, where the fibrous particles have a length of from approximately 0.5 to 1000 microns and a diameter of from approximately 0.1 to 20 microns. These inorganic refractory powders may be employed singly or as an admixture thereof.

The coupling agents (e) which are employed in the present invention are silane compounds which are represented by the above-mentioned formula (I) or (II) and capable of forming two or three silanol groups in the molecule after hydrolysis, as well as hydrolysates of the compounds. Preferred examples of the agents include vinyltris($\beta$-methoxyethoxy)silane $CH_2\!=\!CHSi(OC_2H_4\!-\!OCH_3)_3$, vinyltriethoxysilane $CH_2\!=\!CHSi(OC_2H_5)_3$, vinyltrimethoxysilane $CH_2\!=\!CHSi(OCH_3)_3$, vinyltriacetoxysilane 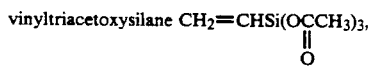

$\gamma$-methacryloxypropyltrimethoxysilane
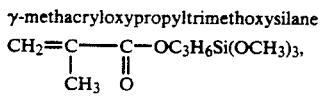

$\beta$-(3,4-epoxycyclohexyl)ethyltrimethoxysilane
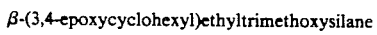

$\gamma$-glycidoxypropyltrimethoxysilane
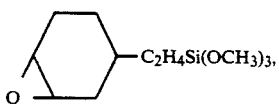

$\gamma$-glycidoxypropylmethyldiethoxysilane
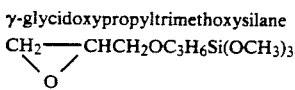

N-$\beta$-(aminoethyl)-$\gamma$-aminopropyltrimethoxysilane
$H_2NC_2H_4NHC_3H_6Si(OCH_3)_3$, N-$\beta$(aminoethyl)-$\gamma$-aminopropylmethyldimethoxysilane
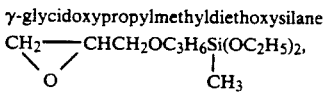

$\gamma$-aminopropyltriethoxysilane 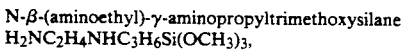 or
$\gamma$-anilinopropyltrimethoxysilane
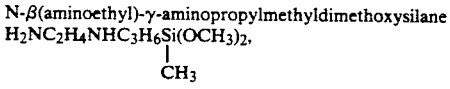 and the like. Additionally, an aqueous solution of a hydrolysate to be obtained by blending the silane compound and water may also be employed in the present invention.

The composition of the present invention can contain any other optional components in addition to the above-mentioned components, so far as it may attain the objects of the present invention. Examples of additional components which may optionally be incorporated into the composition of the present invention are a powder of a bentonite clay mineral as an antisettling agent, as well as cellulose acetate, ethyl cellulose, hydroxyethyl cellulose, and synthetic organic polymers such as polyvinyl pyrrolidone, polyvinyl alcohol and the like. A colorant may also be added to the composition, which includes, for example, inorganic or organic pigments for coloration, such as titanium oxide, iron oxide, chromium oxide or poster color.

For the purpose of enhancing the fluidity and the adhesion property of the composition, various kinds of surface active agents or surface-treating agents as well as a small amount of hydrophilic organic solvents such as methanol, ethanol or the like may also be added to the composition.

For blending the respective components to prepare the composition of the invention, any known stirrers or mixers may be used and the components may well be blended with ease.

In blending the components, they may be added to a container all at a time or one by one in any desired order.

Blending of the components is desired to be effected under the condition of pertinent temperature and pressure so that the components are not dried during blending. For instance, the components are blended at a temperature of approximately 5° C. to 40° C. for a period of time of approximately 0.5 to 5 hours in an atmospheric condition to obtain a preferred composition.

As one preferred embodiment, the composition of the invention has a solid content of from approximately 40 to 95% by weight and has a viscosity of from 1 to 10000 poise at 20° C. Where it is stored in a closed vessel at room temperature, it has a storage stability without deteriorating for several months or more.

The composition of the present invention is hardened by drying at a temperature higher than the freezing temperature. Preferably, it is hardened by drying at a temperature of from 80° to 300° C. to obtain an especially advantageous hardened product.

The interaction between the components in the composition of the present invention is complicated and could not completely be clarified up to the present. Anyway, it has been found that the second, fourth or fifth composition comprising (a) and (b) and additionally two components of (c) and (d), or (c) and (e), or (d) and (e) displays a more improved adhesive capacity than the first or third composition comprising (a) and (b) and additionally (c) or (e); and the sixth composition comprising (a) and (b) and additionally three components of (c), (d) and (e) displays the most improved adhesive capacity. The interaction between the plural components could be considered to be as follows:

Precisely, silica particles in the aqeuous silica sol have alkali ions as adsorbed to the surfaces thereof for stabilizing the dispersion of the particles in the sol. Where the composition does not contain the fine powdery silica, the electric insulating resistance of the hardened product of the composition gradually lowers with absorption of water in air immediately after drying, since the above-mentioned alkali ions may freely move in the hardened product under a high voltage condition. However, by adding the fine powdery silica, which has an extremely large specific surface area, to the aqueous silica sol, the alkali ions in the aqueous silica sol are to be adsorbed to the surfaces of the fine silica particles in the fine powdery silica. As a result, the molar ratio of $SiO_2/M_2O$ (where M has the same meaning as mentioned above) is elevated as a whole so that the electric insulating resistance of the hardened product would not lower.

Additonally, the alkali silicate as added may cover the surface of the silica particles in the aqueous silica sol, the particles in the fine powdery silica and the particles in the inorganic refractory powder so that the specific surface area of the dried and hardened product of the composition is thereby noticeably reduced. As a result, the number of the —OH groups as existing in the unit surface area of the particles would decrease so that the adsorption of water to the dried and hardened product would be lowered. Because of these reasons, the electric insulating property of the hardened product is considered to be improved.

The silane compounds as represented by the above-mentioned formula (I) or (II) are, when added to the aqueous silica sol, brought into contact with water contained in the sol so that the alkoxy group of the compound is converted into a silanol group. The resulting silanol group is chemically or physically bonded to the surfaces of the colloidal silica particles, those of the powdery inorganic refractory particles and those of the fine powdery silica particles, during blending the compound with the aqueous silica sol, the inorganic refractory powder and the fine silica powder. Where an aqueous solution of the hydrolysate of the said silane compound is employed, the same bonds are also formed. As a result, in the blend system of the adhesive composition, the dispersibility of the inorganic refractory powder is noticeably elevated; and the bonds between the colloidal silica particles with the surfaces of the powdery inorganic refractory particles and those of the fine powdery silica particles extremely increase in the dried and hardened product from the adhesive composition. As a result, after the composition has been hardened to form a hardened product, the mechanical strength of the hardened product is extremely improved. The function of the silanol group to be derived by hydrolysis of the silane compound shows itself also in the bonds between the surfaces of the substances to be bonded with the adhesive and the colloidal silica particles because of the same reason as above. As a result, after the adhesive composition as applied to the substances to be bonded therewith has been hardened, the bonding between the hardened product layer and the surfaces of the substances to be bonded is considered to be improved and elevated noticeably. Precisely, the coupling agents of the present invention have a function of forming a hardened product layer which is dense and has an extremely improved mechanical strength and of extremely elevating the bonding strength between the hardened product layer and the surfaces of the substances to be bonded with the layer.

Additionally, improvement of the dispersibility of the inorganic refractory powder because of the function of the silanol group to be derived by hydrolysis of the silane compounds results in improvement of fluidity and workability of the composition of the invention. Moreover, the proportion of the inorganic refractory powder to the colloidal silica in the composition may be increased because of the improvement of the dispersibility of the inorganic refractory powder and, as a result, uneven shrinkage, cracking or foaming which often occurs during hardening of the adhesive composition could remarkably be inhibited and the thermal expansion coefficient of the hardened product layer may easily be controlled.

Furthermore, the organic group as bonded to the silicon atom via the carbon atom in the silane compound has a function of remarkably lowering the water-absorption of the hardened product layer and of thereby elevating the electric insulating property of the layer.

Where a conventional adhesive composition comprising only an aqueous silica sol and an inorganic refractory powder is used, the strength of the dried and hardened product layer would often be lower because of adsorption of water to the layer so that the hardened adhesive layer would often separate from the substrate substance. As opposed to this, water is hardly adsorbed to the hardened product layer to be formed from the adhesive composition of the present invention, such an unfavorable lowering of the strength of the hardened product layer does not occur.

However, if the particle size of the silica particles in the aqueous silica sol is smaller than 5 millimicrons, the stability of the composition would be poor. On the other hand, if it is more than 200 millimicrons, the silica particles in the aqueous sol would frequently precipitate in the composition whereby the aqueous silica sol is ineffective for expressing a high bonding powder.

If the molar ratio of $SiO_2/M_2O$ (where M has the same meaning as defined above) is less than 30, a part of the surfaces of the colloidal silica particles would be dissolved with ease and the stability of the sol tends to be poor. Therefore, the molar ratio is preferably higher. However, a sol having a higher molar ratio than 2000 is hardly obtained.

If the $SiO_2$ concentration in the aqueous silica sol to be employed in the present invention is too high, the stability of the sol is poor so that the composition would become too thick and would therefore gel frequently. However, if the $SiO_2$ concentration is too low, the bonding power of the hardened product from the composition would be poor. Therefore, the preferred concentration range is from approximately 1 % by weight to 50% by weight.

The aqueous silica sol is preferably alkaline rather than acidic, since the former may impart a higher adhesive strength to the hardened product of the composition. It is desirable to employ a mixture comprising plural aqueous silica sols each having a different mean particle size. This is because the filled density of the coagulated silica particles is elevated and a hardened product having a high adhesion strength may be obtained advantageously.

Where the fine powdery silica (c) to be employed in the present invention has a particle size of more than 400 millimicrons, it would have a small specific surface area. However, if it is less than 5 millimicrons, the particles could not exist stably. Accordingly, the fine powdery silica is to have a particle size of from approximately 5 to 400 millimicrons, as being generally available and being expected to have the intended effect.

However, in preparing the composition, when the proportion of the fine powdery silica is more than 500 parts by weight relative to 100 parts by weight as $SiO_2$ of the aqueous silica sol, the molar ratio of $SiO_2/M_2O$ (where M has the same meaning as defined above) would rise too much so that the stability of the composition would be lost. If, on the other hand, it is less than 0.2 part by weight, a hardened product having a high electric insulating property could not be obtained.

The particle size of the particles of the refractory powder to be in the composition of the invention does not have any significant influence on the properties of the adhesive composition itself, but the refractory powder is advantageously a non-fibrous powder having a particle size of from approximately 0.5 to 350 millimicrons or a fibrous powder having a diameter of from approximately 0.1 to 20 microns and a length of 1000 microns or less. In particular, the refractory powder is preferably in the form of a mixture comprising particles of plural types each having a different mean particle size so that the filled density of the hardened product form the composition may be elevated. By adjusting the particle size of the particles of the refractory powder to be employed in the present invention, a composition having a good workability can be obtained. However, if the proportion of the refractory powder is less than 50 parts by weight to 100 parts by weight of $SiO_2$ of the aqueous silica sol, the shrinkage would be too large when the composition is hardened. That is, the hardened product would be ununiformly shrunk, or cracked, or foamed. On the contrary, if the proportion of the refractory powder is more than 100000 parts by weight relative to 100 parts by weight of $SiO_2$ of the aqueous silica sol, the fluidity and the workability of the adhesive composition would worsen. Additionally, since the amount of the colloidal silica would be relatively lowered, a composition capable of forming a hardened adhesive product layer having a high adhesion strength could not be obtained.

By further adding the aqueous alkali silicate solution, a more improved adhesive composition can be obtained. If the molar ratio of $SiO_2/M'_2O$ (where M' has the same meaning as defined above) of the aqueous alkali silicate solution to be employed is more than 30, the alkali silicate would have an insufficient capacity of covering the surfaces of the above-mentioned refractory powder particles and fine silica particles. On the contrary, if the molar ratio of $SiO_2/M'_2O$ is less than 1, the hardened product of the composition tends to absorb much more of water and results lowering of the strength of the hardened products. If the concentration of the aqueous alkali silicate solution to be added is more than 60% by weight, the resulting composition would have a poor stability so that it would often be thickened or gelled. On the other hand, if it is less than 1% by weight, the covering capacity over the surfaces of the said particles would be poor.

Where the aqueous alkali silicate solution is added to the composition, if the solution is more than 500 parts by weight as the solid content thereof to 100 parts by weight of $SiO_2$ of the aqueous silica sol, the composition would have a poor stability. However, if it is less than 0.1 part by weight thereto, the effect by addition of the solution could not be attained.

If the amount of the coupling agents to be added to the composition is less than 0.05 part by weight to 100 parts by weight of $SiO_2$ of the aqueous silica sol, a hardened product having the above-mentioned improved properties could not be formed from the adhesive composition. On the contrary, if it is more than 500 parts by weight to 100 parts by weight of $SiO_2$ of the aqueous silica sol, the stability of the resulting adhesive composition would noticeably lower. In particular, it is preferred to add the coupling agents in an amount of from 0.5 to 100 parts by weight to 100 parts by weight of $SiO_2$ of the aqueous silica sol, so as to obtain a favorable adhesive composition.

In preparing the composition of the present invention by adding both the aqueous silica sol and the coupling agents thereto in the proportion defined above, if the components are blended at a too high temperature, the resulting composition would be gelled. Therefore, the temperature for blending the composition is preferably approximately 40° C. or lower, more preferably room temperature. If the solid concentration in the adhesive composition obtained by blending the constitutive components mentioned above is too high, the composition may be diluted with water to obtain a desired composition having an intended solid concentration.

The present invention will be explained in more detail by way of the following examples, which, however, are not intended to restrict the scope of the present invention.

The following substance to be used in the following examples were prepared. Precisely, ($A_1$) to ($A_3$) are commercial products of aqueous silica sol; ($A_4$) is one prepared by diluting ($A_1$) with water; ($B_1$) to ($B_4$) are commercial products of inorganic refractory powder; ($C_1$) is a commercial product of fine powdery silica; ($D_1$) to ($D_5$) are commercial products of aqueous alkali silicate solution; and ($E_1$) to ($E_5$) are commercial products of coupling agent.

($A_1$): An alkaline aqueous sol having a particle size of colloidal silica of being from 10 to 20 millimicrons, a molar ratio of $SiO_2/Na_2O$ of being 66, and an $SiO_2$ concentration of being 40% by weight.

($A_2$): An alkaline aqueous sol having a particle size of colloidal silica of being from 70 to 100 millimicrons, a molar ratio of $SiO_2/Na_2O$ of being 1300, and an $SiO_2$ concentration of being 40% by weight.

($A_3$): An alcidic aqueous sol having a particle size of colloidal silica of being from 10 to 20 millimicrons, a molar ratio of $SiO_2/Na_2O$ of being 500, and an $SiO_2$ concentration of being 20% by weight.

($A_4$): alkaline aqueous sol as obtained by diluting ($A_1$) with water and having an $SiO_2$ concentration of being 5% by weight.

($B_1$): A quartz powder having a particle size distribution of from 0.5 to 400 microns.

($B_2$) : An alumina powder having a particle size distribution of from 0.5 to 400 microns.

($B_3$) A quartz powder having a particle size distribution of from 5 to 150 microns.

($B_4$): An alumina powder having a particle size distribution of from 5 to 60 microns.

($C_1$): A commercial fine powdery silica prepared by gas phase process and having a particle size of 12 millimicrons.

($D_1$): An aqueous lithium silicate solution having a concentration of 20% by weight and a molar ratio of $SiO_2/Li_2O$ of being 4.5.

($D_2$): An aqueous quaternary ammonium silicate solution having a concentration of 40% by weight and a molar ratio of $SiO_2/M'_2O$ (where M' represents a quaternary ammonium group) of being 14.0.

($D_3$): An aqueous sodium silicate solution having a concentration of 30% by weight and a molar ratio of $SiO_2/Na_2O$ of being 3.6.

($D_4$): An aqueous potassium silicate solution having a concentration of 30% by weight and a molar ratio of $SiO_2/K_2O$ of being 4.0.

($D_5$) : An aqueous sodium silicate solution obtained by diluting ($D_3$) with water and having a concentration of 5% by weight.

($E_1$): γ-glycidoxypropyltrimethoxysilane.

($E_2$): N-β-(aminoethyl)-γ-aminopropyltrimethoxysilane.

($E_3$) : Vinyltriacetoxysilane.

($E_4$): γ-methacryloxypropyltrimethoxysilane.

($E_5$): γ-glycidoxypropylmethyldiethoxysilane.

Properties of the composition as prepared in the following examples and the hardened products derived therefrom were tested by the following methods.

Stability Test

A composition to be tested is stored in a closed glass container at 20° C. for 24 hours, and the fluidity of the thus stored composition was visually checked with the naked eye.

Workability Test

A composition to be tested is put in a glass container in an amount to have a depth of 15 cm and then stored therein as it is at 20° C. for 24 hours. Then a stainless steel bar having a diameter of 5 mm is inserted vertically into the composition, whereupon it is observed as to whether or not the top edge of the bar could reach the bottom of the container. Accordingly, the presence or absence of the precipitated solid in the composition is checked.

Hardenability Test

A composition to be tested is coated over the complete surface of a glass sheet having a square of 20 mm×20 mm, the thickness of the coated composition being 2 mm. Then, the thus coated glass sheet is put in a drier and dried at 110 ° C. for 30 minutes and thereafter taken out therefrom. Presence or absence of cracks on the surface of the thus hardened product is visually checked with the naked eye. Additionally, the pencile hardness of the surface of the hardened product is measured, whereupon the surface having a pencil hardness of 2H or higher is determined to be hard, whilst others having a lower hardness than the former are determined to be insufficient (not hard).

Electric Insulating Property Test

A composition to be tested is put into a glass tube having an outer diameter of 8 mm, an inner diameter of 6 mm and a length of 20 mm, and lead wires each having a diameter of 0.7 mm were inserted from the center part of the both ends of the tube in a depth of 5 mm. The composition is then dried at 110° C. for 30 minutes and further heated at 150° C. for 30 minutes, and then allowed to stand in a room having a temperature of 20° C. and a relative humidity of 90% for 24 hours. Afterwards, an voltage of 500 V is imparted from a direct current battery whereupon the electric resistance through the hardened product is measured.

Adhesion Strength Test

Two glass sheets each having a square of 20 mm×20 mm are bonded over the complete surfaces thereof via a composition to be tested. Then the composition is hardened by heating and drying at 110° to 150° C. for 30 minutes and subsequently at 200° C. for 30 minutes, whereby the two sheets are bonded to each other. Next, fixing tools are attached to both sides of the thus bonded glass sheets with a commercial high-strength adhesive, and a tension is applied to the direction perpendicular to the bonded glass sheets by the use of a tensile tester at a speed of 1 mm/min, whereupon the tension with which the bonded part of the glass sheets is broken is measured. Additionally, the broken surface of the bonded part is visually observed with the naked eye. "L" indicates that the bonded part was broken because of breakage of the adhesive layer; while "S" indicates that the bonded part was broken because of separation of the glass sheet from the adhesive layer.

EXAMPLE 1

An aqueous silica sol, a fine powdery silica and an inorganic refractory powder, which are indicated in Table 1 below, were mixed in a mixer for 2 hours at room temperature, to prepare compositions ($Q_1$) to ($Q_5$) mentioned in Table 1.

EXAMPLE 2

An aqueous silica sol, an aqueous alkali silicate solution, a fine powdery silica and an inorganic refractory powder, which are indicated in Table 1 below, were mixed in a mixer for 3 hours at room temperature, to prepare compositions ($Q_6$) to ($Q_{19}$) mentioned in Table 1.

EXAMPLE 3

An aqueous silica sol, an aqueous alkali silicate solution, a fine powdery silica, an inorganic refractory powder and a silane coupling agent, which are indicated in Table 3 below, were mixed at room temperature for 3 hours, to prepare compositions ($Q_{20}$) to ($Q_{22}$).

Next, the properties of these compositions ($Q_1$) to ($Q_{22}$) and the hardened products thereof were tested in accordance with the above-mentioned test methods. The results obtained are shown in Table 2 and Table 4 below.

COMPARATIVE EXAMPLE 1

In the same manner as in Example 1, comparative compositions ($R_1$) to ($R_4$) were prepared, each comprising the components shown in Table 1. These were also tested by the above-mentioned test methods, and the results obtained are shown in Table 2.

The comparative composition ($R_1$) had a low insulating resistance; and the comparative composition ($R_2$) gelled after stored overnight. The comparative composition ($R_3$) gave a hardened product having cracks, and measurement of the insulating resistance thereof was impossible. The case ($R_4$) could not be a composition and therefore measurement of the insulating resistance thereof was impossible.

COMPARATIVE EXAMPLE 2

In the same manner as in Example 2, comparative compositions ($R_5$) to ($R_9$) were prepared, each comprising the components shown in Table 1. These were also tested by the above-mentioned test methods, and the results obtained are shown in Table 2.

The comparative compositions ($R_5$) had a low insulating resistance, and ($R_6$) gelled after stored overnight. ($R_7$) also gelled after being stored overnight. ($R_8$) gave a hardened product having cracks, and measurement of the insulating resistance thereof was impossible. ($R_9$) could not be a composition and therefore measurement of the insulating resistance thereof was impossible.

TABLE 1

| Composition | Aqueous Silica Sol (wt. pts.) | | Aqueous Alkali Silicate Solution (wt. pts.) | Fine Powdery Silica (wt. pts.) | | Inorganic Refractory Powder (wt. pts.) | | | |
|---|---|---|---|---|---|---|---|---|---|
| $Q_1$ | $A_1$ | 250 | — | $C_1$ | 150 | $B_1$ | 110 | | |
| $Q_2$ | $A_1$ | 250 | — | $C_1$ | 0.3 | $B_1$ | 500, | $B_2$ | 500 |
| $Q_3$ | $A_4$ | 2000 | — | $C_1$ | 190 | $B_1$ | 200, | $B_2$ | 200 |

TABLE 1-continued

| Composition | Aqueous Silica Sol (wt. pts.) | | Aqueous Alkali Silicate Solution (wt. pts.) | | Fine Powdery Silica (wt. pts.) | | Inorganic Refractory Powder (wt. pts.) | | | |
|---|---|---|---|---|---|---|---|---|---|---|
| $Q_4$ | $A_1$ | 250 | — | | $C_1$ | 20 | $B_1$ | 400, | $B_2$ | 400 |
| $Q_5$ | $A_4$ | 2000 | — | | $C_1$ | 5 | $B_1$ | 19000 | | |
| $Q_6$ | $A_1$ | 250 | $D_1$ | 120 | $C_1$ | 0.6 | $B_1$ | 600, | $B_2$ | 600 |
| $Q_7$ | $A_2$ | 250 | $D_1$ | 120 | $C_1$ | 20 | $B_1$ | 400, | $B_2$ | 400 |
| $Q_8$ | $A_3$ | 250 | $D_1$ | 120 | $C_1$ | 20 | $B_1$ | 400, | $B_2$ | 400 |
| $Q_9$ | $A_4$ | 2000 | $D_1$ | 120 | $C_1$ | 20 | $B_1$ | 400, | $B_2$ | 400 |
| $Q_{10}$ | $A_2$ | 220 | $D_2$ | 180 | $C_1$ | 20 | $B_1$ | 400, | $B_2$ | 400 |
| $Q_{11}$ | $A_2$ | 360 | $D_3$ | 40 | $C_1$ | 20 | $B_1$ | 400, | $B_2$ | 400 |
| $Q_{12}$ | $A_2$ | 330 | $D_4$ | 70 | $C_1$ | 20 | $B_1$ | 400, | $B_2$ | 400 |
| $Q_{13}$ | $A_2$ | 200 | $D_5$ | 200 | $C_1$ | 20 | $B_1$ | 400, | $B_2$ | 400 |
| $Q_{14}$ | $A_1$ | 250 | $D_1$ | 120 | $C_1$ | 20 | $B_1$ | 400, | $B_2$ | 400 |
| $Q_{15}$ | $A_1$ | 250 | $D_1$ | 2000 | $C_1$ | 480 | $B_1$ | 200, | $B_2$ | 200 |
| $Q_{16}$ | $A_2$ | 250 | $D_3$ | 0.5 | $C_1$ | 20 | $B_1$ | 250, | $B_2$ | 250 |
| $Q_{17}$ | $A_2$ | 250 | $D_1$ | 2400 | $C_1$ | 80 | $B_1$ | 1500, | $B_2$ | 1500 |
| $Q_{18}$ | $A_1$ | 250 | $D_1$ | 120 | $C_1$ | 400 | $B_1$ | 110 | | |
| $Q_{19}$ | $A_4$ | 2000 | $D_5$ | 10000 | $C_1$ | 20 | $B_1$ | 49000, | $B_2$ | 49000 |
| $R_1$ | $A_1$ | 250 | — | | $C_1$ | 0.1 | $B_1$ | 500, | $B_2$ | 500 |
| $R_2$ | $A_4$ | 2000 | — | | $C_1$ | 220 | $B_1$ | 200, | $B_2$ | 200 |
| $R_3$ | $A_2$ | 250 | — | | $C_1$ | 150 | $B_1$ | 90 | | |
| $R_4$ | $A_4$ | 2000 | — | | $C_1$ | 5 | $B_1$ | 21000 | | |
| $R_5$ | $A_1$ | 250 | $D_5$ | 200 | $C_1$ | 0.3 | $B_1$ | 600, | $B_2$ | 600 |
| $R_6$ | $A_4$ | 2000 | $D_2$ | 200 | $C_1$ | 520 | $B_1$ | 200, | $B_2$ | 200 |
| $R_7$ | $A_2$ | 250 | $D_3$ | 1700 | $C_1$ | 80 | $B_1$ | 1500, | $B_2$ | 1500 |
| $R_8$ | $A_1$ | 250 | $D_1$ | 120 | $C_1$ | 400 | $B_1$ | 90 | | |
| $R_9$ | $A_4$ | 2000 | $D_5$ | 10000 | $C_1$ | 20 | $B_1$ | 51000, | $B_2$ | 51000 |

TABLE 2

| Composition | Stability (gelation) | Hardenability | | Insulating Resistance (MΩ) | Adhesion Strength (kg/cm$^2$) |
|---|---|---|---|---|---|
| | | (hardness) | (cracks) | | |
| $Q_1$ | No | Hard | No | 80 | 18 |
| $Q_2$ | " | " | " | 17 | 18 |
| $Q_3$ | " | " | " | 70 | 20 |
| $Q_4$ | " | " | " | 25 | 17 |
| $Q_5$ | " | " | " | 18 | 17 |
| $Q_6$ | No | Hard | No | 22 | 24 |
| $Q_7$ | " | " | " | 110 | 25 |
| $Q_8$ | " | " | " | 110 | 25 |
| $Q_9$ | " | " | " | 20 | 25 |
| $Q_{10}$ | " | " | " | 27 | 22 |
| $Q_{11}$ | " | " | " | 60 | 23 |
| $Q_{12}$ | " | " | " | 70 | 25 |
| $Q_{13}$ | " | " | " | 35 | 25 |
| $Q_{14}$ | " | " | " | 100 | 26 |
| $Q_{15}$ | No | Hard | No | 110 | 24 |
| $Q_{16}$ | " | " | " | 30 | 21 |
| $Q_{17}$ | " | " | " | 80 | 25 |
| $Q_{18}$ | " | " | " | 115 | 23 |
| $Q_{19}$ | " | " | " | 60 | 23 |
| $R_1$ | No | Hard | No | 1.5 | 20 |
| $R_2$ | Yes | — | | — | — |
| $R_3$ | No | Insufficient | Yes | — | — |
| $R_4$ | — | — | | — | — |
| $R_5$ | No | Hard | No | 1.7 | 21 |
| $R_6$ | Yes | — | | — | — |
| $R_7$ | " | | | — | — |
| $R_8$ | No | Insufficient | Yes | — | — |
| $R_9$ | — | — | | — | — |

TABLE 3

| Composition | Aqueous Silica Sol (wt. pts.) | | Aqueous Alkali Silicate Solution (wt. pts.) | | Fine Powdery Silica (wt. pts.) | | Inorganic Refractory Powder (wt. pts.) | | | | Silane Coupling Agent (wt. pts.) | | | |
|---|---|---|---|---|---|---|---|---|---|---|---|---|---|---|
| $Q_{20}$ | $A_3$ | 250 | $D_4$ | 100 | $C_1$ | 20 | $B_1$ | 400, | $B_2$ | 400 | $E_1$ | 20 | | |
| $Q_{21}$ | $A_2$ | 250 | $D_2$ | 120 | $C_1$ | 25 | $B_1$ | 450, | $B_2$ | 450 | $E_1$ | 2, | $E_5$ | 18 |
| $Q_{22}$ | $A_3$ | 500 | $D_1$ | 110 | $C_1$ | 25 | $B_1$ | 500, | $B_2$ | 500 | $E_1$ | 21 | | |

TABLE 4

| Composition | Stability (gelation) | Hardenability (hardness) | (cracks) | Insulating Resistance (MΩ) | Adhesion Strength (kg/cm$^2$) |
|---|---|---|---|---|---|
| $Q_{20}$ | No | Hard | No | 115 | 29 |
| $Q_{21}$ | " | " | " | 105 | 28 |
| $Q_{22}$ | " | " | " | 120 | 31 |

EXAMPLE 4

250 parts by weight of the above-mentioned aqueous silica sol ($A_1$), 10 parts by weight of the above-mentioned coupling agent ($E_1$), 370 parts by weight of the above-mentioned refractory powder ($B_3$) and 370 parts by weight of the above-mentioned refractory powder ($B_4$) were mixed in a mixer for one hour at room temperature, to obtain a composition ($Q_{23}$) of the present invention.

Next, the properties of the composition ($Q_{23}$) were tested in accordance with the methods mentioned above, and the results obtained are shown in Table 6 below. The thickness of the layer is also listed in the Table 6.

In the same manner, other compositions ($Q_{24}$) to ($Q_{33}$) mentioned in Table 5 below were prepared and the properties thereof were tested also in the same manner. The results obtained are shown in Table 6.

COMPARATIVE EXAMPLE 3

Comparative compositions ($R_{10}$) to ($R_{14}$) were prepared in the same manner as in Example 4, except that the components as indicated in Table 5 were employed. The properties of these compositions were tested in accordance with the methods mentioned above, and the results obtained are shown in Table 6. The comparative composition ($R_{11}$) gelled after being stored overnight, which therefore was not tested. As being difficult, the insulation test on ($R_{12}$) was not effected. Preparation of the composition ($R_{13}$) was difficult, as the proportion of the inorganic refractory powder was too high.

The test results of all the compositions prepared in Example 4 were good. However, the comparative composition ($R_{14}$) which contained no coupling agent showed extremely low workability, hardenability, electric resistance and adhesion strength. Also in the case of the comparative composition ($R_{10}$) which contained only an extremely small amount of a coupling agent, it was found that the workability, hardenability, electric resistance and adhesion strength of the composition were not improved. As containing too less or too much refractory powder, respectively, the comparative compositions ($R_{12}$) and ($R_{13}$) could not have sufficiently improved workability and hardenability.

TABLE 5

| Composition | Proportion of Ingredients | | | | | |
|---|---|---|---|---|---|---|
| | Sol | wt. pts. | Coupling Agent | wt. pts. | Refractory Powder | wt. pts. |
| $Q_{23}$ | $A_1$ | 250 | $E_1$ | 10 | $B_3$ | 370 |
| | | | | | $B_4$ | 370 |
| $Q_{24}$ | $A_2$ | 250 | $E_1$ | 10 | $B_3$ | 370 |
| | | | | | $B_4$ | 370 |
| $Q_{25}$ | $A_2$ | 250 | $E_2$ | 10 | $B_3$ | 370 |
| | | | | | $B_4$ | 370 |
| $Q_{26}$ | $A_2$ | 250 | $E_3$ | 10 | $B_3$ | 370 |
| | | | | | $B_4$ | 370 |
| $Q_{27}$ | $A_2$ | 250 | $E_4$ | 10 | $B_3$ | 370 |
| | | | | | $B_4$ | 370 |
| $Q_{28}$ | $A_2$ | 250 | $E_5$ | 10 | $B_3$ | 370 |
| | | | | | $B_4$ | 370 |
| $Q_{29}$ | $A_2$ | 250 | $E_1$ | 10 | $B_3$ | 740 |
| $Q_{30}$ | $A_2$ | 250 | $E_1$ | 10 | $B_4$ | 740 |
| $Q_{31}$ | $A_3$ | 250 | $E_2$ | 10 | $B_3$ | 370 |
| | | | | | $B_4$ | 370 |
| $Q_{32}$ | $A_4$ | 2000 | $E_1$ | 490 | $B_3$ | 2500 |
| | | | | | $B_4$ | 2500 |
| $Q_{33}$ | $A_2$ | 250 | $E_1$ | 0.06 | $B_3$ | 370 |
| | | | | | $B_4$ | 370 |
| $Q_{34}$ | $A_4$ | 2000 | $E_1$ | 100 | $B_3$ | 4500 |
| | | | | | $B_4$ | 4500 |
| $Q_{35}$ | $A_2$ | 250 | $E_1$ | 10 | $B_3$ | 30 |
| | | | | | $B_4$ | 30 |
| $R_{10}$ | $A_2$ | 2500 | $E_1$ | 0.04 | $B_3$ | 370 |
| | | | | | $B_4$ | 370 |
| $R_{11}$ | $A_4$ | 2000 | $E_1$ | 550 | $B_3$ | 2500 |
| | | | | | $B_4$ | 2500 |
| $R_{12}$ | $A_2$ | 250 | $E_1$ | 10 | $B_3$ | 20 |
| | | | | | $B_4$ | 20 |
| $R_{13}$ | $A_4$ | 2000 | $E_1$ | 100 | $B_3$ | 5500 |
| | | | | | $B_4$ | 5500 |
| $R_{14}$ | $A_1$ | 250 | — | 0 | $B_3$ | 370 |
| | | | | | $B_4$ | 370 |

TABLE 6

| Composition | Stability (fluidity) | Workability (flocculation) | Hardenability (hardness) | (cracks) | Electric Resistance (MΩ) | Adhesion Strength (kg/cm$^2$) | (thickness, mm) | (breakage) |
|---|---|---|---|---|---|---|---|---|
| $Q_{23}$ | Yes | No | Hard | No | 5 | 25 | 0.35 | L |
| $Q_{24}$ | Yes | No | Hard | No | 5-10 | 36 | 0.35 | L |
| $Q_{25}$ | Yes | No | Hard | No | 5 | 33 | 0.35 | L |
| $Q_{26}$ | Yes | No | Hard | No | 10 | 21 | 0.35 | L |
| $Q_{27}$ | Yes | No | Hard | No | 10 | 20 | 0.35 | L |
| $Q_{28}$ | Yes | No | Hard | No | 5-10 | 30 | 0.35 | L |
| $Q_{29}$ | Yes | No | Hard | No | 5-10 | 36 | 0.35 | L |
| $Q_{30}$ | Yes | No | Hard | No | 5-10 | 35 | 0.35 | L |
| $Q_{31}$ | Yes | No | Hard | No | 15 | 20 | 0.35 | L |
| $Q_{32}$ | Yes | No | Hard | No | 15 | 18 | 0.1 | L |
| $Q_{33}$ | Yes | No | Hard | No | 5 | 15 | 0.35 | L |
| $Q_{34}$ | Yes | No | Hard | No | 5 | 25 | 0.35 | L |
| $Q_{35}$ | Yes | No | Hard | No | 5 | 30 | 0.1 | L |
| $R_{10}$ | Yes | Yes | Insufficient | Yes | 1 | 10 | 0.35 | S |
| $R_{11}$ | No | — | — | — | — | — | — | — |
| $R_{12}$ | Yes | No | Insufficient | Yes | — | 26 | 0.1 | L |
| $R_{13}$ | No | — | — | — | — | — | — | — |

TABLE 6-continued

| Composition | Stability (fluidity) | Workability (flocculation) | Hardenability (hardness) | (cracks) | Electric Resistance (MΩ) | Adhesion Strength (kg/cm$^2$) | (thickness, mm) | (breakage) |
| --- | --- | --- | --- | --- | --- | --- | --- | --- |
| $R_{14}$ | Yes | Yes | Insufficient | Yes | 1 or less | 5 | 0.35 | S |

EXAMPLE 5

One end of a stainless steel wire having a thickness of 1 mm was inserted into the joint part of a ceramic insulator joint, and the joint part was filled with the composition ($Q_{35}$) as prepared in Example 4. This was then dried in a drier at 110° C. for 30 minutes and then at 200° C. for 30 minutes, whereby the wire and the insulator were bonded to each other. Next, a tension of 50 kg was imparted to the insulator and the stainless steel wire, but the bonded part was not broken.

EXAMPLE 6

An aqueous silica sol, an aqueous alkali silicate solution, a fine powder silica, an inorganic refractory powder and a silane coupling agent, which are indicated in Table 7 below, were mixed for 3 hours at room temperature, to prepare compositions ($Q_{36}$) to ($Q_{39}$) mentioned in Table 7.

Next, the properties of these compositions ($Q_{36}$) to ($Q_{39}$) and those of the hardened products thereof were tested in accordance with the above-mentioned test methods. The results obtained are shown in Table 8 below.

TABLE 7

| Composition | Aqueous Silica Sol (wt. pts.) | | Aqueous Alkali Silicate Solution (wt. pts.) | | Fine Powdery Silica (wt. pts.) | | Inorganic Refractory Powder (wt. pts.) | | | | Silane Coupling Agent (wt. pts.) | |
| --- | --- | --- | --- | --- | --- | --- | --- | --- | --- | --- | --- | --- |
| $Q_{36}$ | $A_1$ | 250 | — | | $C_1$ | 30 | $B_1$ | 750, | $B_2$ | 750 | $E_2$ | 30 |
| $Q_{37}$ | $A_2$ | 250 | — | | $C_1$ | 40 | $B_1$ | 500, | $B_2$ | 500 | $E_5$ | 25 |
| $Q_{38}$ | $A_1$ | 250 | $D_1$ | 200 | — | | $B_1$ | 600, | $B_2$ | 600 | $E_2$ | 25 |
| $Q_{39}$ | $A_3$ | 500 | $D_2$ | 220 | — | | $B_1$ | 700, | $B_2$ | 700 | $E_4$ | 30 |

TABLE 8

| Composition | Stability (gelation) | Hardenability (hardness) | (cracks) | Insulating Resistance (MΩ) | Adhesion Strength (kg/cm$^2$) |
| --- | --- | --- | --- | --- | --- |
| $Q_{36}$ | No | Hard | No | 95 | 21 |
| $Q_{37}$ | No | Hard | No | 97 | 20 |
| $Q_{38}$ | No | Hard | No | 31 | 26 |
| $Q_{39}$ | No | Hard | No | 25 | 25 |

The adhesive composition of the present invention can be prepared with ease and it may simply be hardened by drying at room temperature or by heating up to a temperature of approximately 300° C. to give a hardened product having a noticeably improved electric insulating property. Accordingly, it may advantageously be used for adhesion of materials of the same kind or different kinds which are required to have a high insulating property, such as ceramics, glass, slates, hardened cement products, aluminium stainless steel, iron and other metal materials, whereupon the bonded part displays an extremely improved electric insulating property and mechanical strength. Additionally, the adhesive composition of the present invention may also be used for adhesion of a metal plate and a ceramic fiber mat and for adhesion of mortar plates.

As other advantageous merits, the composition of the present invention has a sufficient storage stability for an extremely long period of time and has excellent fluidity and workability in operation of adhesion or coating with the composition. Additionally, after hardened, the composition gives a hardened adhesive product which neither cracks nor shrinks. Even when repeated heat-shocks are applied to the hardened adhesive product, the bonded part is not broken. That is, the hardened product from the composition of the invention has an extremely excellent heat shock-resistance. Therefore, the composition of the invention may conveniently be used for adhesion of various electric parts or electronic parts, such as sensor, as well as other various parts of electric or electronic appliances.

While the invention has been described in detail and with reference to specific embodiments thereof, it will be apparent to one skilled in the art that various changes and modifications can be made therein without departing from the spirit and scope thereof.

What is claimed is:

1. A method of bonding together materials of the same kind or different kinds selected from the group consisting of ceramics, glass, slates, hardened cement products and metal materials, comprising (1) putting between and in contact with two adjacent surfaces of said materials an adhesive composition comprising:

(a) an aqueous silica sol having a mean particle size of from 5 to 200 millimicrons and a molar ratio of $SiO_2/M_2O$ (where M represents an alkali metal atom, an amine molecule, or a quaternary ammonium group) of from 30 to 2000, in an amount of 100 parts by weight as $SiO_2$;

(b) an inorganic refractory powder having a particle size of from 0.5 to 1000 microns, in an amount of from 100 to 100000 parts by weight;

(c) a fine powdery silica in amorphous form having a particle size of from 5 to 200 millimicrons, in an amount of from 0.5 to 500 parts by weight;

(d) an aqueous solution of an alkali silicate having a molar ratio of $SiO_2/M'_2O$ (where M' represents Na, K, Li, an amine molecule, or a quaternary ammonium group) of from 1 to 30 and having an alkali silicate concentration of from 1 to 60% by weight, in an amount of from 0.1 to 500 parts by weight as the alkali silicate component; and (e) one or more coupling agents selected from the group consisting of a silane compound of a general formula (I):

$$R^1Si(OR)_3 \quad (I)$$

where OR represents an alkoxy or acyloxy group having from 1 to 3 carbon atoms, and $R^1$ represents a monovalent organic group having from 2 to 9 carbon atoms, or a hydrolysate thereof, and a silane compound of a general formula (II):

$$R^1SiCH_3(OR)_2 \quad (II)$$

where

OR and $R^1$ have the same meanings as defined above, or a hydrolysate thereof, in an amount of from 0.05 to 100 parts by weight;

the solid content of the components (a), (b), (c), (d) and (e) being from 40 to 95% by weight;

said composition having a viscosity of from 1 to 10000 poise at 20° C.;

(2) drying and hardening said composition between said surfaces at a temperature higher than the freezing temperature of the composition not to exceed 300° C.

2. The method as claimed in claim 1, in which the drying is effected at a temperature of 80° to 300° C.

3. A method as claimed in claim 1, wherein said aqueous silica sol (a) has a mean particle size of from 10 to 150 millimircorns and has an $SiO_2$ concentration of from 1 to 50% by weight and in which M is selected from the group consisting of Na, K, Li, methylamine, ethylamine, ethanolamine, tetramethylammonium, monomethyltriethanolammonium, isopropyltriethanolammonium, and tetraethanolammonium.

4. A method as claimed in claim 1, wherein said inorganic refractory powder (b) comprises at least one member selected from the group consisting of powder of quartz, powder of silica, powder of feedspar, powder of aluminum silicate, powder of zirconium silicate, powder of mullite, powder of zirconia, powder of alumina, powder of silicon nitride, powder of silicon carbide, powder of talc, powder of mica, fibrous powder of glass fiber and fibrous powder of potassium titanate fiber.

5. A method as claimed in claim 1, wherein said aqueous alkali silicate solution (d) has a molar ratio of $SiO_2/M'_2O$ of from 1 to 10 and has an alkali silicate concentration of from 5 to 50% by weight and wherein M' is selected from the group consisting of Na, K, Li, methylamine, ethylamine, ethanolamine, tetramethylammonium, monomethyltriethanolammonium, isopropyltriethanolammonium and tetrathanolammonium.

6. A method as claimed in claim 1, wherein said coupling agent (e) comprises at least one member selected from the group consisting of vinyltris($\beta$-methoxyethoxy)silane, vinyltriethoxysilane, vinyltrimethoxysilane, vinyltriacetoxysilane, $\gamma$-methacryloxypropyltrimethoxysilane, $\beta$-(3,4-epoxycyclohexyl)ethyltrimethoxysilane, $\gamma$-glycidoxypropyltrimethoxysilane, $\gamma$-glycidoxypropylmethyldiethoxysilane, N-$\beta$(aminoethyl)$\gamma$-aminopropylmethyldimethoxysilane, $\gamma$aminopropyltriethoxysilane, $\gamma$-anilinopropyltrimethoxysilane, and hydrolysates of the silanes recited in said group.

* * * * *